T. C. WOOD.
Car Brake.
No. 81,568. Patented Aug. 25, 1868.
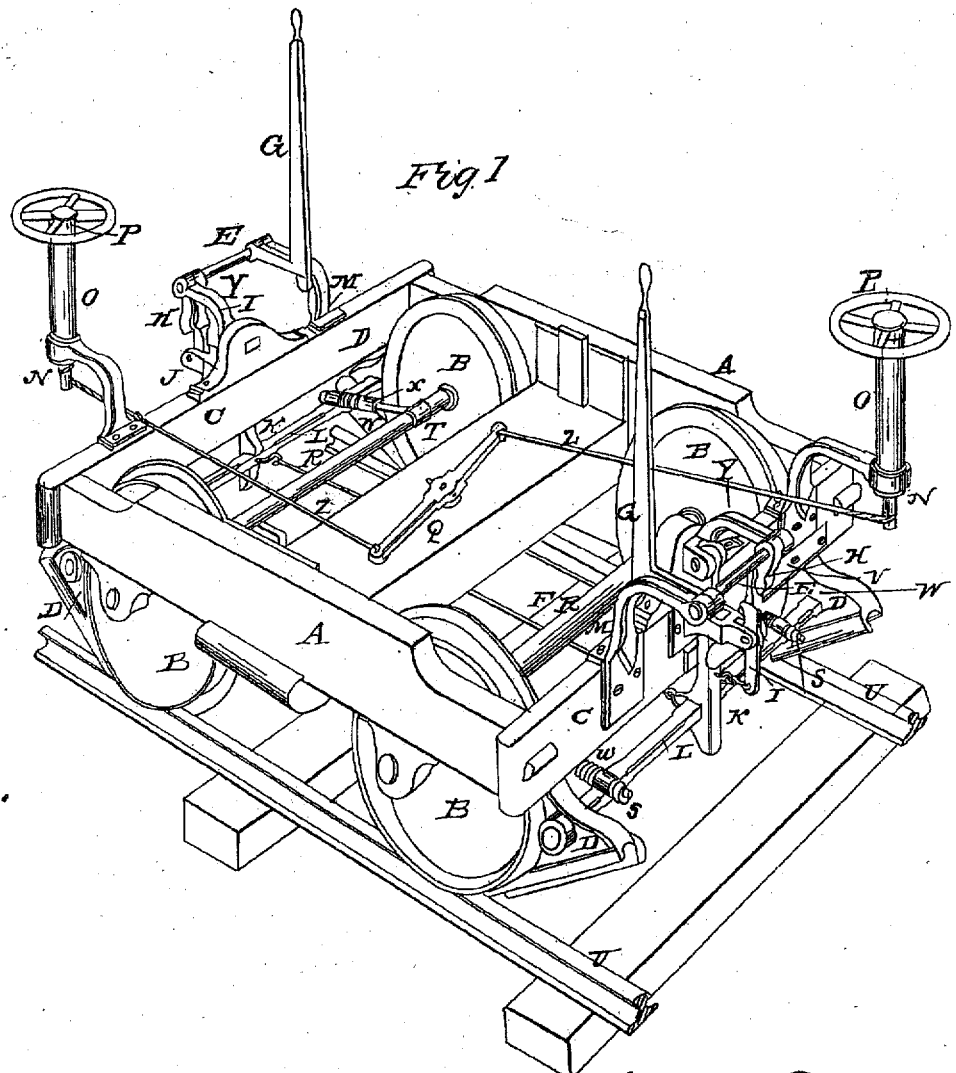

United States Patent Office.

THOMAS C. WOODS, OF MARION COUNTY, KENTUCKY.

Letters Patent No. 81,568, dated August 25, 1868.

---

IMPROVED CAR-BRAKE.

---

The Schedule referred to in these Letters Patent and making part of the same.

---

TO ALL WHOM IT MAY CONCERN:

Be it known that I, THOMAS C. WOODS, of the county of Marion, and State of Kentucky, have invented a new and useful improvement in railroad-car brakes, entitled "Thomas C. Woods' Improvement in Car-Brakes," for the purpose of checking or stopping the train suddenly, if necessary, while under way, when there is danger of collision, or otherwise.

The above improvement consists in so constructing and arranging the brakes or rubbers D that work on the face of the wheels, B, that they can be used as a common friction-brake, or, when it becomes necessary, they can be dropped down on the rails, in front of the wheels, so that they may pass under the wheels, and operate as a check or slide, preventing them from turning, and hence stop the train; and I do hereby declare that the following is a full, clear, and exact description of the construction and operation of the same, reference being had to the annexed drawings, making part of this specification, in which—

Figure 1 is a perspective view of a common railroad-car truck, such as are commonly used on railroads, showing all the parts or fixtures belonging thereto at one view.

A is the side of the frame of the truck, to which the axles of the wheels are attached.

B is the wheels.

C is the cross-pieces of the truck-frame, to which the brake-fixtures are attached.

D is the slide part of the brake, and the form of said brake D, on the friction-side, where it works against the wheel B, and on the slide-side, which works on the rails U, is determined by and exactly coincides with the form of the space presented by the rails and wheels. When standing upon the rails, the form or shape of the third side is a matter of fancy.

On the inside edge of the slide-side of the brake D there is a flanch, the exact counterpart of the flanches on the wheels B, to prevent the cars from jumping the track when the wheels mount the slides or brake.

The above slide or brake D is used as a common friction-brake under ordinary circumstances, and is operated in the same manner as those now in use, but in case of an emergency, when it becomes necessary to stop the train suddenly, it is only necessary to detach the shaft L, which holds up the brake D, from the catch K, and they drop down on the rails in front of and pass under the wheels, and cause them to ride them, and operate as a check or slide, preventing them from turning, and after the train has been stopped, it is only necessary to close up this slide-brake D, on the face of the wheels B, by turning the wheel P, as in the ordinary brake, after which back the train slightly, and the friction on the face of the wheels, when the connecting-rod F is attached to the bottom of the car-body, immediately over the centre of the axle R, so as to keep it up as high as the centre of the axle, will raise up the brakes and replace the shaft L, by which they are held up again in the catch K, and after which reverse the wheel P, and it relieves the friction from the face of the wheels, and leaves them free to proceed again.

L is the shaft or axle, to which the two slides D are attached, and by which they are held up, and said axle is made of wrought iron, about two by three inches square.

T is two wrought-iron hinge-bolts, having an eye or sleeve on one end, through which the axle of the wheels passes, and in which they revolve, and from which all the brake-fixtures are suspended, and working on said axle R similar to a hinge, so as to admit of the brakes being lowered or raised at pleasure. Said hinge-bolt T also passes through the shaft L, and has a screw and nut on the end, at S, in order to adjust the brakes D a proper distance from the face of the wheels, so as not to touch them except when necessary. Said bolt T has a collar, near the middle, at X, in order to form a base, against which the spiral spring W rests.

Said spring W is for the purpose of pressing back the brakes from the face of the wheels B when not in use. The above brakes and fixtures, when put together, can be raised or lowered at pleasure.

The sleeve on the end of the bolt T, turning on the axle R of the wheels the same as that of a hinge, K, is the catch which holds up the shaft L, and is attached to the frame of the truck by a bolt at the top, running through a small stand at the top end of the catch K, and said catch K is kept to its place by the spring V, and is operated by the lever I.

In front of said catch K, which has an arm, H, which works against the lever I, which presses it back and detaches the shaft L, when the lever G is pressed forward and lets the brakes D drop down on the rails J, is the stand or fulcrum-block, to which lever I is attached.

The lever G and the stands Y and M, when used on the railroad-cars, are attached to the under side of the car-body instead of the truck.

N and O are the stand and sheath, which supports the wheel P which works the brake D by the rods Z and F, connecting with the lever Q above and a small lever below the frame of the truck, and when used as a friction-brake, the pressure is put on in the same manner as those now in use on ordinary railroad-cars.

The wheel P, with its fixtures, when in practical use, is attached to the front of the car-platform, the same as those now in use, and not on the truck-frame.

Z and F are the rods or chains running back to the lever Q in the centre of the truck, and by these the brakes are operated in the usual way.

The above machinery is made of iron, and in the manner above set forth, except the frame of the truck, which is made of either wood or iron, and said machinery or brakes are operated, when under way, by turning the wheel P, which closes the brakes D on the wheels B, the same as those now in ordinary use, and hence checks the train, but when there is danger ahead, it is only necessary to press forward the lever G, and it detaches the shaft L from the catch K, and lets the brake D drop down on the rails in front, and the wheels B immediately mount the brakes, and they become a slide or chock, and stop the train in a short time.

I do not claim anything as original in the construction of the railroad-car truck and its fixtures; but What I do claim as my invention or improvement, and desire to secure by Letters Patent, is—

The brakes D, constructed as described, when connected by the bar L, and held in place by the bolts T and spring W, and when operated and applied by the arrangement of catches and disengaging-apparatus, all substantially as and for the purpose set forth.

THOS. C. WOODS.

Witnesses:
W. C. PHILLIP,
JOHN SEVERANCE.